(12) United States Patent
Huang et al.

(10) Patent No.: US 9,296,612 B2
(45) Date of Patent: Mar. 29, 2016

(54) METHODS OF MAKING LOW COST ELECTRODE ACTIVE COMPOSITE MATERIALS FOR SECONDARY ELECTROCHEMICAL BATTERIES

(71) Applicants: Guiqing Huang, Newton, MA (US); Boshan Mo, Newton, MA (US); Youde Mo, Newton, MA (US)

(72) Inventors: Guiqing Huang, Newton, MA (US); Boshan Mo, Newton, MA (US); Youde Mo, Newton, MA (US)

( * ) Notice: Subject to any disclaimer, the term of this patent is extended or adjusted under 35 U.S.C. 154(b) by 294 days.

(21) Appl. No.: 13/971,252

(22) Filed: Aug. 20, 2013

(65) Prior Publication Data

US 2014/0054494 A1   Feb. 27, 2014

Related U.S. Application Data

(60) Provisional application No. 61/692,803, filed on Aug. 24, 2012.

(51) Int. Cl.
*C01B 25/45* (2006.01)
*H01M 4/485* (2010.01)

(52) U.S. Cl.
CPC ........................... *C01B 25/45* (2013.01)

(58) Field of Classification Search
CPC ....................................................... C01B 25/45
USPC ........................................................ 252/182.1
See application file for complete search history.

(56) References Cited

U.S. PATENT DOCUMENTS

2006/0147365 A1* 7/2006 Okada et al. ................. 423/306
2011/0068295 A1* 3/2011 Beck et al. ................... 252/182.1
2011/0117003 A1* 5/2011 Wissemborski et al. ..... 423/306

FOREIGN PATENT DOCUMENTS

CN           102311109 A  *  1/2012

* cited by examiner

*Primary Examiner* — Mark Kopec
*Assistant Examiner* — Danny N Kang
(74) *Attorney, Agent, or Firm* — Tim Tingkang Xia, Esq.; Locke Lord LLP (57) ABSTRACT

In one aspect, a method of synthesizing a phosphorous active electrode composite material $AMPO_4$ is disclosed. M is a first element selected from a group of transitional metals, such as iron (Fe), manganese (Mn), and others, and A is a second element selected from a group consisting of lithium (Li), sodium (Na), potassium (K) and a mixture thereof. The method includes: forming a phosphate composite from a phosphorus source material and a first source material comprising the first element M; mixing the phosphate composite with a second source material comprising the second element A to form an intermediate mixture with A:M:P=1.03-1.1:1:1 by molar ratio; ball-milling and drying the intermediate mixture; and sintering the intermediate mixture to form the phosphorous composite active electrode material. The first source material and the metalloid source material are low cost by-products respectively obtained in other processes.

22 Claims, 8 Drawing Sheets

METHODS OF MAKING LOW COST ELECTRODE ACTIVE COMPOSITE MATERIALS FOR SECONDARY ELECTROCHEMICAL BATTERIES

CROSS-REFERENCE TO RELATED PATENT APPLICATION

This application claims priority to and the benefit of, pursuant to 35 U.S.C. §119(e), U.S. provisional patent application Ser. No. 61/692,803, filed Aug. 24, 2012, entitled "NOVEL METHOD OF PROCESSING LOW COST $A_aM_b(XO_4)_c$ COMPOSITE ELECTRODE MATERIALS FOR A SECONDARY ELECTROCHEMICAL BATTERY," by Guiqing Huang, Boshan Mo and Youde Mo, the disclosure of which is incorporated herein in their entirety by reference.

FIELD OF THE INVENTION

This invention relates generally to methods and processes of making active electrode composite materials, and particularly to methods of synthetizing $A_aM_b(XO_4)_cZ_d$ active electrode composite materials for secondary electrochemical batteries using low cost raw materials.

BACKGROUND OF THE INVENTION

As the oldest form of rechargeable battery, the lead-acid battery has been used throughout history for stationary applications. Unfortunately, this outdated storage presents many problems and concerns to this new age, including but not limited to: significant negative impact on the environment, sulfation, low density and low cycle life. These problems created a strong desire to switch from the Lead-acid battery to the more environmentally friendly secondary battery. Recent advances in battery development have promoted Lithium Iron Phosphate (LFP) technology, with its high thermal stability making it suitable for high-rate charge-discharge applications in both vehicles and power tools, however the primary reason lead-acid batteries are not yet abandoned is because of their affordability compared to other alternatives.

Another alternative battery option would be the aqueous electrolyte battery such as aqueous sodium battery. The aqueous sodium cation chemistry in these batteries could be a potential replacement for lead-acid batteries. Not only is it less expensive (compared to the lithium battery) but it also has a smaller environmental footprint. Unfortunately, the low energy density nature of the aqueous sodium battery makes it unsuitable for higher-energy systems, such as vehicular transportation. However, the aqueous sodium battery can still be used to replace lead-acid batteries used in small energy storage applications.

The progress made in battery development has been great, but there is still a lot of room for improvement. For example, batteries such as the LFP battery are still expensive to produce. For instance, in order to manufacture $LiFePO_4$ active material and its dopant, one major production method is using iron oxalate as Fe source precursor and $NH_4H_2PO_4$ as $PO_4$ source precursor. However, the manufacturing process for iron oxalate and $NH_4H_2PO_4$ generates hazardous gas, and the processing cost is very high. Another method which is quickly gaining attention is the use of fine quality iron phosphate as precursor for both Fe and $PO_4$ source. However, the manufacturing cost for iron phosphate is also very high. Thus, there is a need of a new method or process of producing the LFP battery at a reduced cost.

Therefore, a heretofore unaddressed need exists in the art to address the aforementioned deficiencies and inadequacies.

SUMMARY OF THE INVENTION

In one aspect, the present invention relates to a method of synthesizing a phosphorous active electrode composite material $AMPO_4$, where M is a first element and A is a second element. The first element M is selected from a group consisting of iron (Fe), manganese (Mn), and a mixture thereof, and the second element A is selected from a group consisting of lithium (Li), sodium (Na), potassium (K) and a mixture thereof. In one embodiment, the method includes: (a) preparing a first source material comprising the first element M and a phosphorus source material; (b) forming a phosphoric acid aqueous solution with the phosphorus source material, and adding the first source material in the phosphoric acid aqueous solution to form a first mixture; (c) drop-wisely adding a hydrogen peroxide aqueous solution in the first mixture with stirring to form a second mixture, wherein the second mixture comprises a phosphate composite comprising the first element M; (d) measuring amounts of the first element M and phosphorus (P) in the second mixture, and mixing the phosphate composite in the second mixture with a second source material comprising the second element A to form an intermediate mixture, wherein the intermediate mixture is formed with A:M:P=1.03-1.1:1:1 by molar ratio; (e) adding a carbon precursor to the intermediate mixture, where the carbon precursor is about 5-30% by weight to the intermediate mixture; (f) ball-milling and drying the intermediate mixture; and (g) sintering the intermediate mixture in an inert environment at about 250-900° C. for about 6 to 15 hours to form the phosphorous composite active electrode material.

In certain embodiments, the first source material and the phosphorus source material are low cost by-products respectively obtained in other processes.

In certain embodiments, the intermediate mixture is formed by: (a) centrifuging the second mixture to obtain wet phosphate composite; (b) washing the wet phosphate composite; and (c) drying the wet phosphate composite to obtain the phosphate composite.

In certain embodiments, the phosphorous composite active electrode material is $LiFePO_4$, wherein the first element M is iron (Fe), and the second element A is lithium (Li); the first source material comprises at least one of iron powder, iron (III) oxide ($Fe_2O_3$) powder, and iron(II,III) oxide ($Fe_3O_4$) powder; the phosphorus source material comprises at least one of phosphoric acid ($H_3PO_4$) and phosphorus pentoxide ($P_2O_5$); and the phosphorous composite active electrode material $LiFePO_4$ is formed with Li:Fe:P=1-1.1:1:1 by molar ratio.

In certain embodiments, the phosphorous composite active electrode material is $LiFe_xMn_{(1-x)}PO_4$, wherein the first element M comprises iron (Fe) and manganese (Mn), and the second element A is lithium (Li); the first source material comprises at least one of iron powder, iron(III) oxide ($Fe_2O_3$) powder, iron(II,III) oxide ($Fe_3O_4$) powder, manganese powder, and manganese dioxide ($MnO_2$) powder; the phosphorus source material comprises at least one of phosphoric acid ($H_3PO_4$) and phosphorus pentoxide ($P_2O_5$); and the phosphorous composite active electrode material $LiFe_xMn_{(1-x)}PO_4$ is formed with Li:(Fe+Mn):P=1-1.1:1:1 by molar ratio.

In certain embodiments, the phosphoric acid aqueous solution comprises about 10-50% phosphoric acid by weight, the hydrogen peroxide aqueous solution comprises about 5-27% hydrogen peroxide by weight, and a pH value of the first mixture is less than about 2.5.

Another aspect of the invention relates to a method of synthesizing a phosphorous active electrode composite material $AMPO_4$, wherein M is a first element, and A is a second element. The first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof. The second element A is selected from a group consisting of lithium (Li), sodium (Na), potassium (K) and a mixture thereof. In one embodiment, the method includes: (a) forming a phosphate composite from a phosphorus source material and a first source material comprising the first element M; (b) measuring amounts of the first element M and phosphorus (P) in the phosphate composite, and mixing the phosphate composite with a second source material comprising the second element A to form an intermediate mixture, wherein the intermediate mixture is formed with A:M:P=1.03-1.1:1:1 by molar ratio; (c) adding a carbon precursor to the intermediate mixture, where the carbon precursor is about 0-30% by weight to the intermediate mixture; (d) ball-milling and drying the intermediate mixture; and (e) sintering the intermediate mixture in an inert environment at a first temperature for a first period of time to form the phosphorous composite active electrode material.

In certain embodiments, the first source material and the phosphorus source material are low cost by-products respectively obtained in other processes.

In certain embodiments, the first temperature is about 250-900° C., and the first period of time is about 6 to 15 hours.

In certain embodiments, the phosphorous composite active electrode material is $LiFePO_4$, wherein the first element M is iron (Fe), and the second element A is lithium (Li); the first source material comprises at least one of iron powder, iron (III) oxide ($Fe_2O_3$) powder, and iron(II,III) oxide ($Fe_3O_4$) powder; the phosphorus source material comprises at least one of phosphoric acid ($H_3PO_4$) and phosphorus pentoxide ($P_2O_5$); and the phosphorous composite active electrode material $LiFePO_4$ is formed with Li:Fe:P=1-1.1:1:1 by molar ratio.

In certain embodiments, the forming of the phosphate composite includes: (a) adding the first source material in a phosphoric acid aqueous solution to form a first mixture; (b) stirring the first mixture for a second period of time; (c) drop-wisely adding a hydrogen peroxide aqueous solution in the stirred first mixture with stirring for a third period of time to form a second mixture, wherein the second mixture comprises ferric phosphate dihydrate; and (d) obtaining the ferric phosphate dihydrate from the second mixture as the phosphate composite. In certain embodiments, the forming of the phosphate composite further includes: centrifuging the second mixture to obtain wet ferric phosphate dihydrate; washing the wet ferric phosphate dihydrate; and drying the wet ferric phosphate dihydrate to obtain the phosphate composite. In certain embodiments, the second period of time is about 0.5-5 hours, the third period of time is about 3-15 hours, the phosphoric acid aqueous solution comprises about 10-50% phosphoric acid by weight, the hydrogen peroxide aqueous solution comprises about 5-27% hydrogen peroxide by weight, and a pH value of the first mixture is less than about 2.5.

In certain embodiments, the phosphorous composite active electrode material is $LiFe_xMn_{(1-x)}PO_4$, wherein the first element M comprises iron (Fe) and manganese (Mn), and the second element A is lithium (Li); the first source material comprises at least one of iron powder, iron(III) oxide ($Fe_2O_3$) powder, iron(II,III) oxide ($Fe_3O_4$) powder, manganese powder, and manganese dioxide ($MnO_2$) powder; the phosphorus source material comprises at least one of phosphoric acid ($H_3PO_4$) and phosphorus pentoxide ($P_2O_5$); and the phosphorous composite active electrode material $LiFe_xMn_{(1-x)}PO_4$ is formed with Li:(Fe+Mn):P=1-1.1:1:1 by molar ratio.

In certain embodiments, the phosphate composite active electrode material is $AFePO_4$, wherein the first element M is iron (Fe); the phosphate composite is $Fe_xP$; and the second source material comprises at least one of $A_2CO_3$, AOH and $A_2O$. In certain embodiments, the forming of the intermediate mixture includes: mixing the second source material with the phosphate composite to form a first composite with A:Fe=1.05-1.10:1 by molar ratio; sintering the first composite at about 250-600° C. for about 2 to 12 hours, cooling the sintered first composite to room temperature, and ball-milling the cooled first composite to obtain a composite powder; and measuring amounts of the second element A, Fe and P in the composite powder, and mixing the composite powder with the second source material or the phosphate composite to form the intermediate mixture with A:M:P=1.03-1.1:1:1 by molar ratio.

In yet another aspect of the invention, a method of synthesizing an active electrode composite material $A_aM_b(XO_4)_cZ_d$ is disclosed, where M is a first element, A is a second element, X is a metalloid element, Z is a precursor, a, b and c are numbers greater than zero, and d is a number greater than or equal to zero. The first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof. The second element A is selected from a group consisting of lithium (Li), sodium (Na), potassium (K) and a mixture thereof. The metalloid element X is selected from a group consisting of phosphorus (P), Si, sulphur (S), Al, Ge, nitrogen (N), V and a mixture thereof. The precursor Z is selected from a group consisting of OH, F, Cl, Br and a mixture thereof. In certain embodiments, the method includes: (a) forming an intermediate composite from a first source material comprising the first element M and a metalloid source material comprising the first metalloid element X and the precursor Z; (b) measuring amounts of the first element M and the metalloid element X in the intermediate composite, and mixing the intermediate composite with a second source material comprising the second element A to form an intermediate mixture, wherein the intermediate mixture is formed with A:M:X=1.03-1.1:1:1 by molar ratio; (c) adding a carbon precursor to the intermediate mixture, where the carbon precursor is about 0-30% by weight to the intermediate mixture; (d) ball-milling and drying the intermediate mixture; and (e) sintering the intermediate mixture in an inert environment at a first temperature for a first period of time to form the active electrode composite material.

In certain embodiments, the first source material and the metalloid source material are low cost by-products respectively obtained in other processes.

In certain embodiments, the composite active electrode material is $LiFePO_4$, wherein the first element M is iron (Fe), the second element A is lithium (Li), and the metalloid element X is phosphorus (P); the first source material comprises at least one of iron powder, iron(III) oxide ($Fe_2O_3$) powder, and iron(II,III) oxide ($Fe_3O_4$) powder; the metalloid source material comprises at least one of phosphoric acid ($H_3PO_4$) and phosphorus pentoxide ($P_2O_5$); and the composite active electrode material $LiFePO_4$ is formed with Li:Fe:P=1-1.1:1:1 by molar ratio.

In certain embodiments, the forming of the intermediate composite includes: (a) adding the first source material in a phosphoric acid aqueous solution to form a first mixture; (b) stirring the first mixture; (c) drop-wisely adding a hydrogen peroxide aqueous solution in the stirred first mixture with stirring to form a second mixture, wherein the second mixture comprises ferric phosphate dihydrate; and (d) obtaining the ferric phosphate dihydrate from the second mixture as the intermediate composite.

In certain embodiments, the composite active electrode material is $LiFe_xMn_{(1-x)}PO_4$, wherein the first element M comprises iron (Fe) and manganese (Mn), the second element A is lithium (Li), and the metalloid element X is phosphorus (P); the first source material comprises at least one of iron powder, iron(III) oxide ($Fe_2O_3$) powder, iron(II,III) oxide ($Fe_3O_4$) powder, manganese powder, and manganese dioxide ($MnO_2$) powder; the phosphorus source material comprises at least one of phosphoric acid ($H_3PO_4$) and phosphorus pentoxide ($P_2O_5$); and the composite active electrode material $LiFe_xMn_{(1-x)}PO_4$ is formed with Li:(Fe+Mn):P=1-1.1:1:1 by molar ratio.

In certain embodiments, the composite active electrode material is $AFePO_4$, wherein the first element M is iron (Fe), and the metalloid element X is phosphorus (P); the phosphate composite is $Fe_xP$; and the second source material comprises at least one of $A_2CO_3$, AOH and $A_2O$.

Further aspects of the present invention relates to active electrode composite materials synthesized according to the method as disclosed above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope" or "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction" or "XRD" refers to a method of determining the arrangement of atoms within a crystal, in which a beam of X-rays strikes a crystal and diffracts into many specific directions. From the angles and intensities of these diffracted beams, a crystallographer can produce a three-dimensional picture of the density of electrons within the crystal. From this electron density, the mean positions of the atoms in the crystal can be determined, as well as their chemical bonds, their disorder and various other information.

As used herein, terms "nanoscopic," "nanometer-size," "nanometer," the "nano-" prefix, and the like generally refers to elements or articles having widths or diameters of less than about 1 µm. In all embodiments, specified widths can be smallest width (i.e., a width as specified where, at that location, the article can have a larger width in a different dimension), or largest width (i.e., where, at that location, the article's width is no wider than as specified, but can have a length that is greater).

As used herein, "reduction atmosphere", or "reducing atmosphere" is referred to an atmospheric condition in which oxidation is prevented by removal of oxygen and other oxidizing gases or vapors.

As used herein, the term "size" refers to the maximally spatial dimension of a particle, composite or article. For a spherical shape of the particle, composite or article, the size refers to its diameter. Otherwise, it refers to the maximal vertex distance of the particle, composite or article.

As used herein, the terms "comprising," "including," "having," "containing," "involving," and the like are to be understood to be open-ended, i.e., to mean including but not limited to.

OVERVIEW OF THE INVENTION

In order to reduce the cost of the LFP batteries, a method is to lower the cost of producing the precursors involved with creating the battery. The inventor has been using novel methods and processes focusing on inexpensive raw materials which contain the active component, specifically the by-products of other processing companies. These by-products can be refined, oxidized and/or reduced in order to generate the precursor compounds that can be used to create electrode active materials.

Many lower cost raw materials may not be used as a precursor directly, novel process and method are required to transfer them to the forms that can be processed to electrode active materials. For Instance, for $AMPO_4$ active material, the lower cost raw materials could be Fe powder, Ferro Phosphorus ($Fe_xP$), a by-product of the production of yellow phosphorous, ferrous sulphate, a by-product of production of $TiO_2$, and iron phosphate, a by-product of a wet metallurgical industry, which extracting valuable metals such as V, Co, and Ni, from Ferro Phosphorus.

As discussed above, in order to manufacture $LiFePO_4$ active material and its dopant, one major production method is using iron oxalate as Fe source precursor and $NH_4H_2PO_4$ as $PO_4$ source precursor, and another method is the use of fine quality iron phosphate as precursor for both Fe and $PO_4$ source. However, the processing cost for iron phosphate, iron oxalate and $NH_4H_2PO_4$ is very high. Lower cost raw materials are those Fe and P source precursors producing iron phosphate, $NH_4H_2PO_4$, and iron oxalate such as $H_3PO_4$ and $P_2O_5$.

For manufacture, fine control of Fe powder and ferro phosphorus processing steps for AMXO is very difficult. Since any iron powder or ferro phosphorus residue will dramatically reduce the cycle life and capacity of the electrode material, iron battery industry is not taking the risk so far. Processing by-products for LFP, not only for their lower cost, but also for their environmental impact Aspects of the present invention relate to cost effective methods and processes of generating active electrode composite materials using inexpensive by-products of other industries to generate electrode active materials. Specific embodiments, as will be described below, are for use in a secondary electrochemical cell.

In one aspect, the present invention relates to a method of synthesizing a phosphorous active electrode composite material $AMPO_4$, where M is a first element and A is a second element. The first element M is selected from a group consisting of iron (Fe), manganese (Mn), and a mixture thereof, and the second element A is selected from a group consisting of lithium (Li), sodium (Na), potassium (K) and a mixture thereof. In one embodiment, the method includes: (a) preparing a first source material comprising the first element M and a phosphorus source material; (b) forming a phosphoric acid aqueous solution with the phosphorus source material, and adding the first source material in the phosphoric acid aqueous solution to form a first mixture; (c) drop-wisely adding a hydrogen peroxide aqueous solution in the first mixture with stirring to form a second mixture, wherein the second mixture comprises a phosphate composite comprising the first element M; (d) measuring amounts of the first element M and phosphorus (P) in the second mixture, and mixing the phosphate composite in the second mixture with a second source material comprising the second element A to form an intermediate mixture, wherein the intermediate mixture is formed with A:M:P=1.03-1.1:1:1 by molar ratio; (e) ball-milling and drying the intermediate mixture; and (f) sintering the intermediate mixture in an inert environment at about 250-900° C. for about 6 to 15 hours to form the phosphorous composite active electrode material.

Another aspect of the invention relates to a method of synthesizing a phosphorous active electrode composite material AMPO$_4$, wherein M is a first element, and A is a second element. The first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof. The second element A is selected from a group consisting of lithium (Li), sodium (Na), potassium (K) and a mixture thereof. In one embodiment, the method includes: (a) forming a phosphate composite from a phosphorus source material and a first source material comprising the first element M; (b) measuring amounts of the first element M and phosphorus (P) in the phosphate composite, and mixing the phosphate composite with a second source material comprising the second element A to form an intermediate mixture, wherein the intermediate mixture is formed with A:M:P=1.03-1.1:1:1 by molar ratio; (c) ball-milling and drying the intermediate mixture; and (d) sintering the intermediate mixture in an inert environment at a first temperature for a first period of time to form the phosphorous composite active electrode material.

In yet another aspect of the invention, a method of synthesizing an active electrode composite material A$_a$M$_b$(XO$_4$)$_c$Z$_d$ is disclosed, where M is a first element, A is a second element, X is a metalloid element, Z is a precursor, a, b and c are numbers greater than zero, and d is a number greater than or equal to zero. The first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof. The second element A is selected from a group consisting of lithium (Li), sodium (Na), potassium (K) and a mixture thereof. The metalloid element X is selected from a group consisting of phosphorus (P), Si, sulphur (S), Al, Ge, nitrogen (N), V and a mixture thereof. The precursor Z is selected from a group consisting of OH, F, Cl, Br and a mixture thereof. In certain embodiments, the method includes: (a) forming an intermediate composite from a first source material comprising the first element M and a metalloid source material comprising the first metalloid element X and the precursor Z; (b) measuring amounts of the first element M and the metalloid element X in the intermediate composite, and mixing the intermediate composite with a second source material comprising the second element A to form an intermediate mixture, wherein the intermediate mixture is formed with A:M:X=1.03-1.1:1:1 by molar ratio; (c) ball-milling and drying the intermediate mixture; and (d) sintering the intermediate mixture in an inert environment at a first temperature for a first period of time to form the active electrode composite material.

Figure 1:
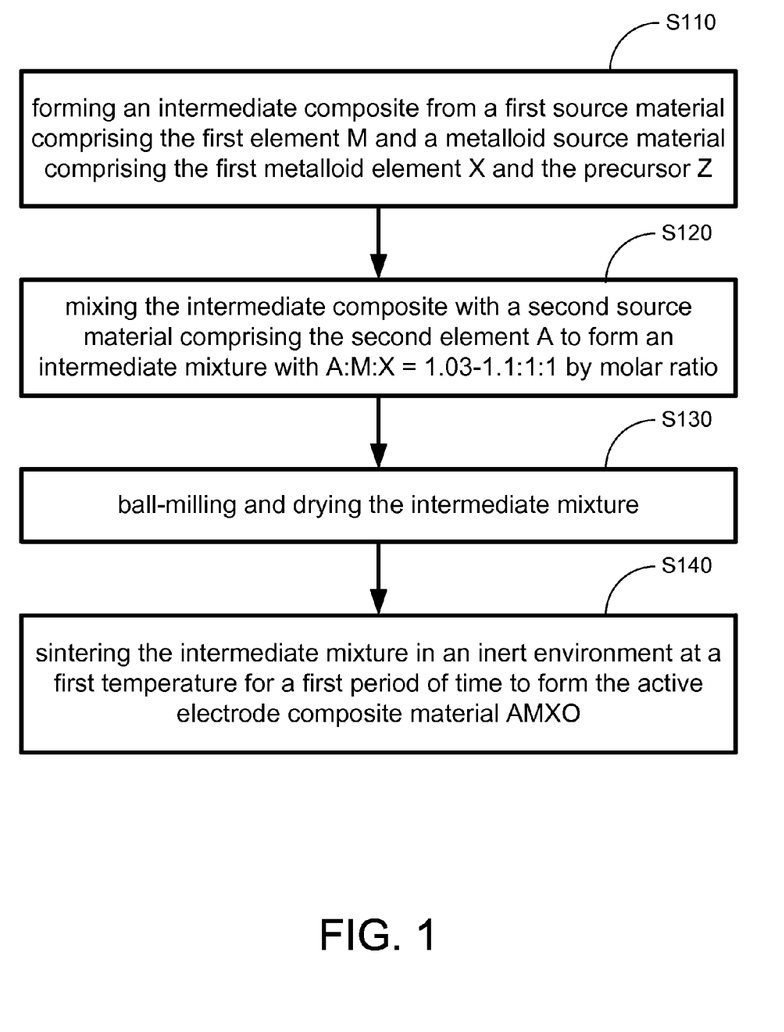
FIG. 1 shows a flowchart of a method of synthesizing an active electrode composite material $A_aM_b(XO_4)_cZ_d$ according to certain embodiments of the present invention.
Figure 2:
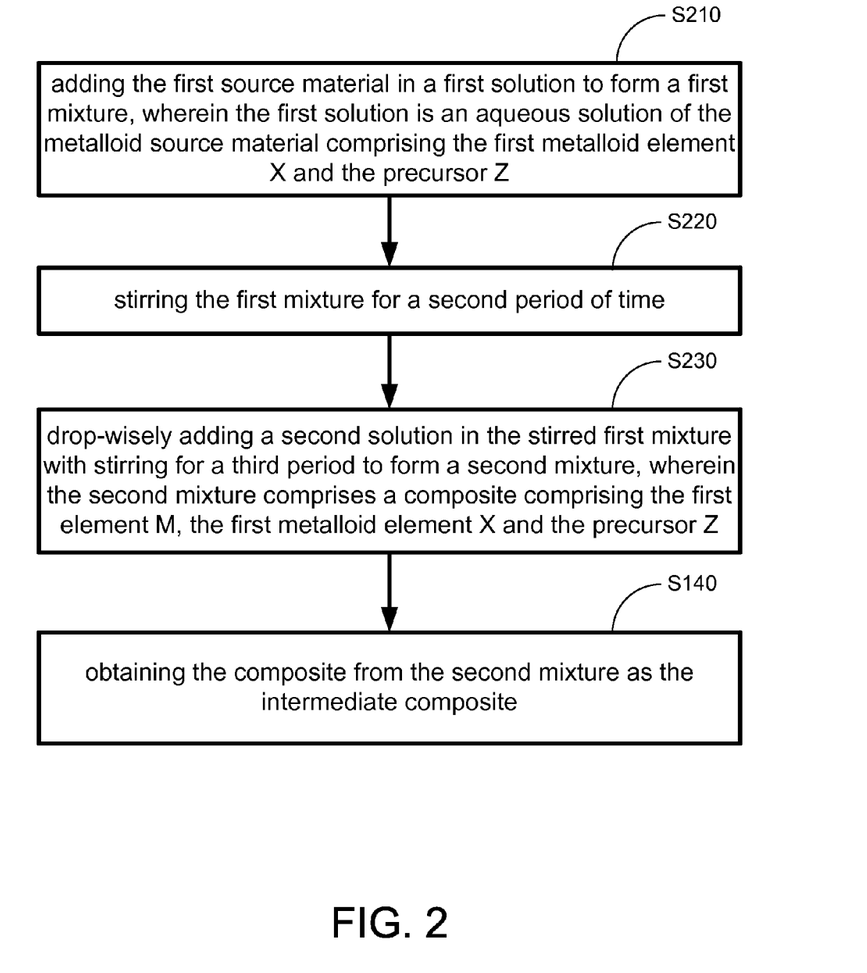
FIG. 2 shows a flowchart of forming the intermediate composite as disclosed in FIG. 1 according to certain embodiments of the present invention.

FIG. 1 shows a flowchart of a method of synthesizing an active electrode composite material AMXO according to certain embodiments of the present invention, and FIG. 2 shows a flowchart of forming the intermediate composite as disclosed in FIG. 1 according to certain embodiments of the present invention. The active electrode composite material AMXO can be formed by mixing the sources materials having the first element M, the second element A, the metalloid element X and a precursor Z. In certain embodiments, the first element M may be selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof, and the second element A may be selected from a group consisting of alkali metals, such as lithium (Li), sodium (Na), potassium (K) and a mixture thereof. The metalloid element X may be selected from a group consisting of phosphorus (P), Si, sulphur (S), Al, Ge, nitrogen (N), V and a mixture thereof. The precursor Z may be selected from a group consisting of functional alcohol group OH, fluorine (F), chlorine (Cl), bromine (Br), and a mixture thereof. In certain embodiments, the first element M may be transition metals include without limitation those of groups 4 through 11, inclusive, of the periodic table. For example, the transition metals include those of the first transition period, namely Ti, V, Cr, Mn, Fe, Co, and Ni.

It should be appreciated that, in the active electrode composite material A$_a$M$_b$(XO$_4$)$_c$Z$_d$, a, b and c are numbers greater than zero, and d is a number greater than or equal to zero. In other words, the active electrode composite material may or may not include the precursor Z.

As shown in FIG. 1, in step S110, an intermediate composite is formed from a first source material comprising the first element M and a metalloid source material comprising the first metalloid element X and the precursor Z. The first source material and the metalloid source material are low cost byproducts respectively obtained in other processes. In certain embodiments, the first source material may be at least one of a powder of the first element M, a salt of the first element M, and an oxide of the first element M. For example, when the first element M is iron (Fe), the first source material may be iron powder, iron(III) oxide (Fe$_2$O$_3$) powder, iron(II,III) oxide (Fe$_3$O$_4$) powder, or a mixture thereof. When the first element M includes iron (Fe) and manganese (Mn), the first source material may include at least one of iron source material, such as iron powder, iron(III) oxide (Fe$_2$O$_3$) powder, or iron(II,III) oxide (Fe$_3$O$_4$) powder, and at least one of manganese source material, such as manganese powder or manganese dioxide (MnO$_2$) powder. Further, when the metalloid element X is P, the metalloid source material may be phosphoric acid (H$_3$PO$_4$) and phosphorus pentoxide (P$_2$O$_5$).

In step S120, the intermediate composite is mixed with a second source material comprising the second element A to form an intermediate mixture with A:M:X=1.03-1.1:1:1 by molar ratio. In certain embodiments, amounts of the first element M and the metalloid element X in the intermediate composite are measured before mixing such that the molar ratio A:M:X of the intermediate mixture can be controlled at A:M:X=1.03-1.1:1:1 by molar ratio. In certain embodiments, the second source material may be at least one of a powder of the second element A, a salt of the second element A, an oxide of the second element A. For example, when the second element is lithium (Li), the second source material may be lithium carbonate ($Li_2CO_3$) powder, lithium hydroxide (LiOH) powder or lithium oxide ($Li_2O$) powder.

In step S130, a process of ball-milling and drying the intermediate mixture is performed. In step S140, a sintering process for the intermediate mixture is performed in an inert environment at a first temperature for a first period of time to form the active electrode composite material AMXO. The first temperature and the first period of time for the sintering process may be adjusted according to the materials. For example, when iron is used as the first element M, lithium is used as the second element A, and phosphoric acid ($H_3PO_4$) is used as the metalloid source material, the first temperature may be about 250-900° C., and the first period of time may be about 6 to 15 hours.

In certain embodiments, the intermediate composite as described in step S110 may be prepared according to the process as shown in FIG. 2. For example, in step S210, the first source material (e.g., at least one of a powder of the first element M, a salt of the first element M, and an oxide of the first element M) is added in a first solution to form a first mixture. The first solution is an aqueous solution of the metalloid source material comprising the first metalloid element X and the precursor Z. For example, when the first element M is iron (Fe) and the metalloid source material is phosphoric acid ($H_3PO_4$), the first solution may be phosphoric acid aqueous solution, which includes about 10-50% phosphoric acid by weight.

In step S220, the first mixture is stirred for a second period of time such that the first source material dissolves in the first solution. In certain embodiments, the second period of time may be about 0.5-5 hours.

In step S230, a second solution is drop-wisely added in the stirred first mixture with stirring for a third period of time to form a second mixture. Thus, the second mixture is a wet mixture which includes a composite comprising the first element M, the first metalloid element X and the precursor Z. In certain embodiments, the third period of time must be long enough such that the first source material and the ions formed by the first element M fully react with the metalloid source material to form the composite. For example, when the first element M is iron (Fe) and the metalloid source material is phosphoric acid ($H_3PO_4$), the composite may be ferric phosphate dihydrate, and the third period of time may be about 3-15 hours.

In step S240, the composite is obtained from the second mixture as the intermediate composite. In certain embodiments, the intermediate composite may be obtained by centrifuging and drying the second mixture. In certain embodiments, the second mixture is centrifuged to obtain a wet intermediate composite. Then, the wet intermediate composite is washed, and the washed wet intermediate composite is dried to obtain the intermediate composite. In certain embodiments, the second mixture can be directly used as the source of the intermediate composite without centrifuging, washing and drying. In certain embodiments, the wet intermediate composite can be directly used as the source of the intermediate composite without washing and/or drying.

Figure 3:
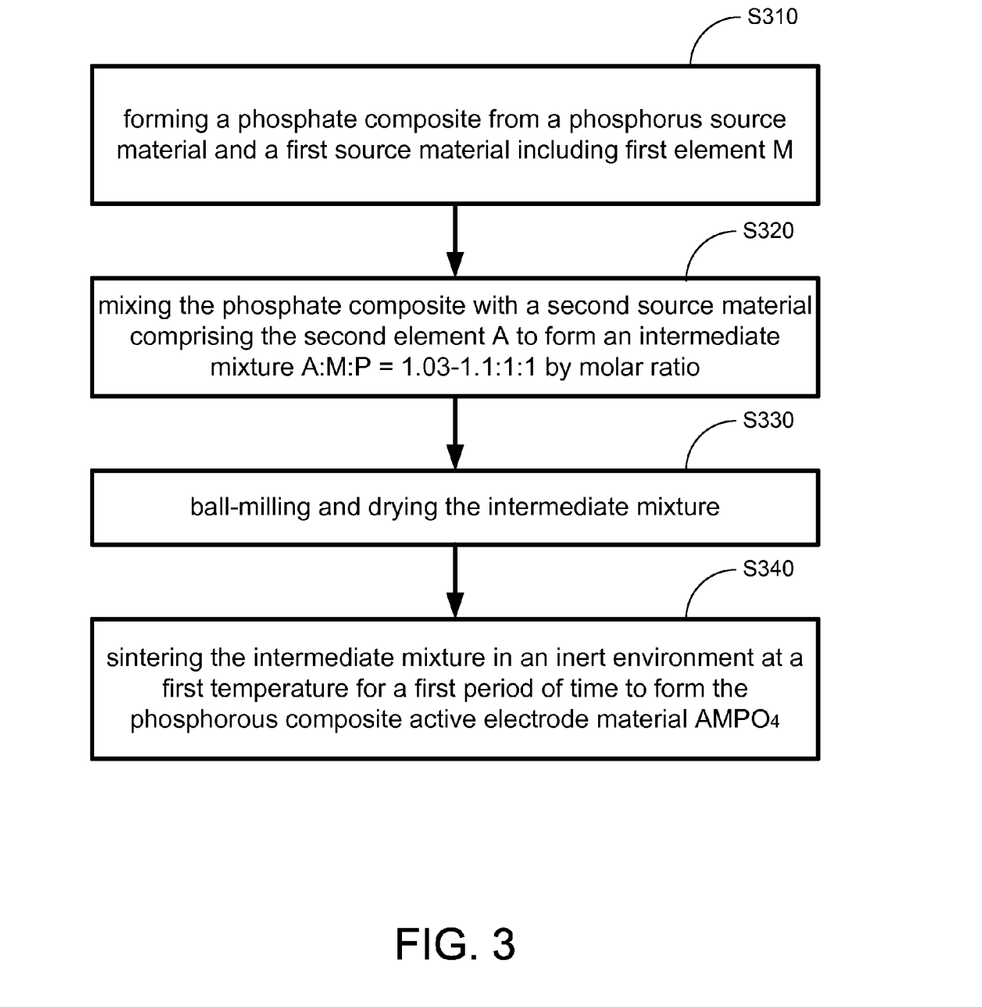
FIG. 3 shows a flowchart of a method of synthesizing a phosphorous active electrode composite material $AMPO_4$ according to certain embodiments of the present invention.
Figure 4:
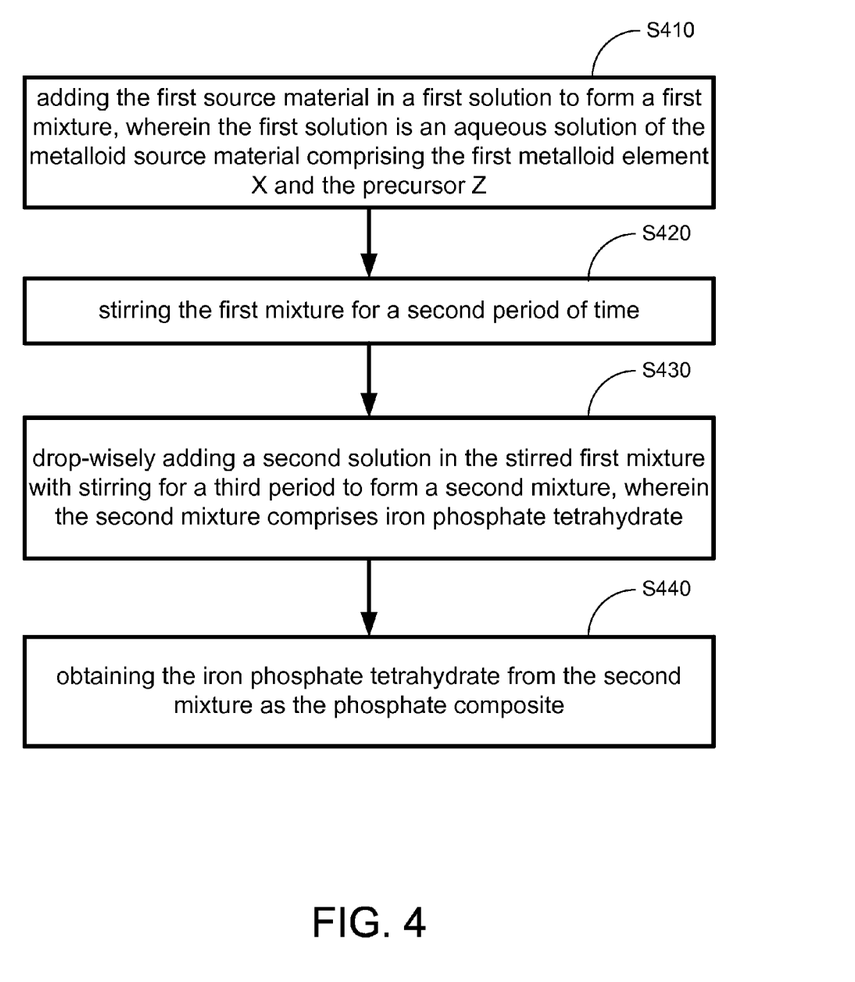
FIG. 4 shows a flowchart of forming the phosphate composite as disclosed in FIG. 3 according to certain embodiments of the present invention.

FIG. 3 shows a flowchart of a method of synthesizing a phosphorous active electrode composite material $AMPO_4$ according to certain embodiments of the present invention, and FIG. 4 shows a flowchart of forming the phosphate composite as disclosed in FIG. 3 according to certain embodiments of the present invention. The active electrode composite material $AMPO_4$ can be formed by mixing the sources materials having the first element M, the second element A, and phosphorus (P). In certain embodiments, the first element M may be selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof, and the second element A may be selected from a group consisting of alkali metals, such as lithium (Li), sodium (Na), potassium (K) and a mixture thereof. In certain embodiments, the first element M may be transition metals include without limitation those of groups 4 through 11, inclusive, of the periodic table. For example, the transition metals include those of the first transition period, namely Ti, V, Cr, Mn, Fe, Co, and Ni.

As shown in FIG. 3, in step S310, a phosphate composite is formed from a phosphorus source material and a first source material comprising the first element M. The first source material and the phosphorus source material are low cost by-products respectively obtained in other processes. In certain embodiments, the first source material may be at least one of a powder of the first element M, a salt of the first element M, and an oxide of the first element M. For example, when the first element M is iron (Fe), the first source material may be iron powder, iron(III) oxide ($Fe_2O_3$) powder, iron(II,III) oxide ($Fe_3O_4$) powder, or a mixture thereof. When the first element M includes iron (Fe) and manganese (Mn), the first source material may include at least one of iron source material, such as iron powder, iron(III) oxide ($Fe_2O_3$) powder, or iron(II,III) oxide ($Fe_3O_4$) powder, and at least one of manganese source material, such as manganese powder or manganese dioxide ($MnO_2$) powder.

In step S320, the phosphate composite is mixed with a second source material comprising the second element A to form an intermediate mixture with A:M:P=1.03-1.1:1:1 by molar ratio. In certain embodiments, amounts of the first element M and the phosphate element P in the phosphate composite are measured before mixing such that the molar ratio A:M:P of the intermediate mixture can be controlled at A:M:P=1.03-1.1:1:1 by molar ratio. In certain embodiments, the second source material may be at least one of a powder of the second element A, a salt of the second element A, an oxide of the second element A. For example, when the second element is lithium (Li), the second source material may be lithium carbonate ($Li_2CO_3$) powder, lithium hydroxide (LiOH) powder or lithium oxide ($Li_2O$) powder.

In step S330, a process of ball-milling and drying the intermediate mixture is performed. In step S340, a sintering process for the intermediate mixture is performed in an inert environment at a first temperature for a first period of time to form the phosphorous active electrode composite material $AMPO_4$. The first temperature and the first period of time for the sintering process may be adjusted according to the materials. For example, when iron is used as the first element M, lithium is used as the second element A, and phosphoric acid ($H_3PO_4$) is used as the metalloid source material, the first temperature may be about 250-900° C., and the first period of time may be about 6 to 15 hours.

In certain embodiments, the phosphorous composite active electrode material is formed with Li:Fe:P=1-1.1:1:1 by molar ratio.

In certain embodiments, the phosphate composite as described in step S310 may be prepared according to the process as shown in FIG. 4. For example, in step S410, the first source material (e.g., at least one of a powder of the first element M, a salt of the first element M, and an oxide of the first element M) is added in a phosphoric acid aqueous solution to form a first mixture. In certain embodiments, the phosphoric acid aqueous solution includes about 10-50% phosphoric acid by weight.

In step S420, the first mixture is stirred for a second period of time such that the first source material dissolves in the first solution. In certain embodiments, the second period of time may be about 0.5-5 hours. In certain embodiments, the dissolving rate of the first source material is determined by the pH value of the first mixture. For example, a pH value of the first mixture may be less than about 2.5 when the first element includes iron (Fe) and/or manganese (Mn). In certain embodiments, ammonium hydroxide may be added to the first mixture or the second mixture to adjust the pH value thereof. For example, ammonium hydroxide may be added to the second mixture such that the pH value of the second mixture becomes about 4.0-6.0 such that additional manganese ions in the second mixture become precipitated manganese particles.

In step S430, a hydrogen peroxide aqueous solution is drop-wisely added in the stirred first mixture with stirring for a third period of time to form a second mixture. For example, when the first element M is iron, the second mixture is a wet mixture which includes ferric phosphate dihydrate. In certain embodiments, the third period of time must be long enough such that the first source material and the ions formed by the first element M fully react with the metalloid source material to form the composite. For example, when the first element M is iron, the third period of time may be about 3-15 hours for the iron powders and the ferrous ions to fully react with the phosphoric acid aqueous solution to form the ferric phosphate dihydrate.

In step S440, the iron phosphate dihydrate is obtained from the second mixture as the phosphate composite. In certain embodiments, the phosphate composite may be obtained by centrifuging and drying the second mixture. In certain embodiments, the second mixture is centrifuged to obtain a wet phosphate composite. Then, the wet phosphate composite is washed, and the washed wet phosphate composite is dried to obtain the phosphate composite. In certain embodiments, the second mixture can be directly used as the source of the phosphate composite without centrifuging, washing and drying. In certain embodiments, the wet phosphate composite can be directly used as the source of the phosphate composite without washing and/or drying.

In the processes as described in FIGS. 1-4, the source materials may be by-products of other processes. For example, when iron (Fe) is used as the first element M, the first source material may be ferro phosphorus ($Fe_xP$) (a by-product of the production of yellow phosphorous), ferrous sulphate (a by-product of production of $TiO_2$), or iron phosphate (a by-product of a wet metallurgical industry). These by-products may be refined, oxidized and/or reduced in order to generate the precursor compounds that can be used in the methods or processes to reduce the cost of making or producing the active electrode composite material.

In certain embodiments, ferro phosphorus powder was converted to different forms of Fe and P composites. In one embodiment, stoichiometrically $Li_2CO_3$ or LiOH is need for the conversion. In another embodiment, stoichiometrically $Na_2CO_3$ or NaOH is needed for the conversion.

In certain embodiments, in order to covert substantially all of the phosphorus content of the ferro phosphorus, a quantity exceeding that stoichiometrically required of alkaline salt for conversion of the phosphorus is needed. For the conversion of all phosphorus and iron, the temperature must be heated to a certain temperature for certain period of time, e.g., about 250-900° C. for 6 to 15 hours.

In certain embodiments, after the ball-milling and drying processes, certain amounts of lithium and phosphorus source compound may be added to the intermediate mixture if it is necessary to make the molar ratio of Li:Fe:P close to 1.0/1.0/1.0. In this case, certain amounts of carbon source compounds may be added the mixture. These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Example 1

In one embodiment, the active electrode composite material is $LiFePO_4$. To make $LiFePO_4$, lower cost Fe and P source precursors may be used. For example, ferro phosphorus powder, a by-product of yellow phosphorus may be used as Fe and P source precursors. Examples of lower cost Fe source precursors include Fe powder, $Fe_2O_3$ powder, and $Fe_3O_4$ powder. Examples of lower cost P source precursors include $H_3PO_4$ and $P_2O_5$. To make $LiFePO_4$, a 10-50% phosphoric acid aqueous solution is prepared. Iron powder is added to the phosphoric acid aqueous solution with P:Fe=1-1.2:1 by molar ratio to form a first mixture. The first mixture is stirred for about 0.5-5 hours. In the stirring process, the pH value of the first mixture is controlled about less than 2.5. Then, a 5-27% hydrogen peroxide aqueous solution is drop-wisely added in the stirred first mixture with stirring for about 3-15 hours, until all iron powder and ferrous ions fully react with the phosphoric acid aqueous solution, thus forming a second mixture. Then, centrifuging the second mixture to obtain ferric phosphate dihydrate, and washing the ferric phosphate dihydrate to remove unwanted materials.

After obtaining the ferric phosphate dihydrate, the amounts of Fe and P in the ferric phosphate dihydrate are measured. Then, the ferric phosphate dihydrate is mixed with lithium source materials with Li:Fe:P=1.03-1.1:1:1 by molar ratio to form an intermediate mixture. The intermediate mixture is then performed with ball-milling and drying procedures, and disposed in an inert environment for sintering at about 250-800° C. for about 6-15 hours to form the phosphorous composite active electrode material $LiFePO_4$. In certain embodiments, the sintering process is performed at about 500-900° C. for about 2-10 hours in an essentially non-oxidizing atmosphere achieved through the use of vacuum, or through the use of inert gases such as argon or nitrogen.

Example 2

In one embodiment, the active electrode composite material is $LiFe_{0.35}Mn_{0.65}PO_4$. To make $LiFe_{0.35}Mn_{0.65}PO_4$, lower cost Fe, Mn and P source precursors may be used. For example, ferro phosphorus powder, a by-product of yellow phosphorus may be used as Fe and P source precursors. Examples of lower cost Fe source precursors include Fe powder, $Fe_2O_3$ powder, and $Fe_3O_4$ powder. Examples of lower cost Mn source precursors include Mn powder and $MnO_2$. Examples of lower cost P source precursors include $H_3PO_4$ and $P_2O_5$. To make $LiFe_{0.5}Mn_{0.5}PO_4$, a 10-50% phosphoric acid aqueous solution is prepared. Manganese and iron powders are respectively added to the phosphoric acid aqueous solution with P:Mn:Fe=1.2:0.65:0.35 by molar ratio to form a first mixture. The first mixture is stirred for about 0.5-5 hours. In the stirring process, the pH value of the first mixture is controlled about less than 2.5. Then, a 5-27% hydrogen peroxide aqueous solution is drop-wisely added in the stirred first mixture with stirring for about 3-15 hours, until all manganese and iron powder and ferrous ions fully react with the phosphoric acid aqueous solution, thus forming a second mixture. Ammonium hydroxide may be added to the first mixture to adjust the pH value of the second mixture becomes about 4.0-6.0 such that additional manganese ions in the second mixture become precipitated manganese particles. Then, centrifuging the second mixture to obtain iron/manganese phosphate composite, and washing the iron/manganese phosphate composite to remove unwanted materials.

After obtaining the iron/manganese phosphate composite, the amounts of M (M=Fe+Mn) and P in the iron/manganese phosphate composite are measured. Then, the composite is mixed with lithium source materials with Li:M:P=1.03-1.1:1:1 by molar ratio to form an intermediate mixture. The intermediate mixture is then performed with ball-milling and drying procedures, and disposed in an inert environment for sintering at about 250-800° C. for about 6-15 hours to form the phosphorous composite active electrode material $LiFe_{0.35}Mn_{0.65}PO_4$.

Example 3

In one embodiment, the active electrode composite material is $AFePO_4$, which is produced with ferro phosphorus $Fe_xP$, a by-product of the production of yellow phosphorous, as the phosphate composite. The second element A may be Li, Na or K. To make the active electrode composite material $AFePO_4$, iron phosphate powder is mixed with a second source material of the second element A with A:Fe=1.05-1.10:1 by molar ratio to form a first composite. The second source material may be $A_2CO_3$, AOH, $A_2O$, or a mixture thereof. The first composite is then heated at about 250-600° C. for about 2-12 hours for sintering. After cooling to room temperature, the heated intermediate mixture is then performed with ball-milling and drying procedures to obtain a composite powder. The amounts of the second element A, Fe and P in the composite powder are measured. Then, the composite powder is mixed with additional Fe and P source materials with A:Fe:P=1.03-1.1:1:1 by molar ratio. Then, the intermediate mixture is disposed in an inert environment for sintering at about 250-600° C. for about 2-12 hours to form the active electrode composite material.

Example 4

In one embodiment, the active electrode composite material is $LiFePO_4$, which is produced with iron phosphate ($Fe_xPO_4$), a by-product of the production of precious metals vanadium (V), cobalt (Co) and nickel (Ni) from ferro phosphorus ($Fe_xP$). To make the active electrode composite material $LiFePO_4$, the amounts of Fe and P in the ferro phosphate are measured. Then, the ferro phosphate composite powder is mixed with lithium material with Li:Fe:P=1.03-1.1:1:1 by molar ratio, and an additional carbon precursor with about 6% by weight is added to the intermediate mixture. Then, the intermediate mixture is then performed with ball-milling and drying procedures to obtain a composite powder, and the composite powder is disposed in an inert environment for sintering at about 250-600° C. for about 2-12 hours to form the active electrode composite material.

Example 5

In one embodiment, the active electrode composite material is $NaTi_2(PO_4)_3$, which is produced with raw materials NaOH, $Ti(SO_4)_2$, and $H_3PO_4$. To make the active electrode composite material $NaTi_2(PO_4)_3$, the raw materials raw materials NaOH, $Ti(SO_4)_2$, and $H_3PO_4$ are mixed in PEG400 with Na:Ti:P=3:2:3 by molar ratio to form a slurry composite. Then, the slurry composite is ball-milled for 60-240 about minutes, heated at about 60-80° C. for about 2-8 hours, and washed with water to remove unreacted and water soluable materials therein. The remaining composite is then dried at 100° C., and goes through a sintering process at about 650-900° C. for about 2-10 hours to form the active electrode composite material $NaTi_2(PO_4)_3$.

In addition to the embodiments as described above, other examples of the active electrode composite material $A_aM_b(XO_4)_cZ_d$ may include, but not limited to: $Li_{0.5}VPO_4F_{0.5}$; $LiVPO_4F$; $Li_3V_2(PO_4)_2F_3$; $Li_2MnPO_4F$; $LiVPO_4Cl$; $LiVPO_4OH$; $NaVPO_4F$; $Na_3V_2(PO_4)_2F$; $Li_2Fe_{0.5}Mn_{0.5}PO_4F$; $Li_2FePO_4Cl$; $Li_2MnPO_4OH$; $Li_2Fe_{0.9}Mg_{0.1}PO_4F$; $Li_2MnPO_4F$; $Li_2FePO_4F$; $Li_4FeMn(SO_4)F_2$; $Li_3MgFe(SO_4)_3F_2$; $Li_{1.5}Fe_{0.75}Mn_{0.25}Mn_{0.25}PO_4F_{0.5}$; $Li_{1.75}Mn_{0.8}Mg_{0.2}PO_4F_{0.75}$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)F$; $LiNaMn_{0.8}Mg_{0.2}(PO_4)F$; and mixtures thereof.

Figure 5:
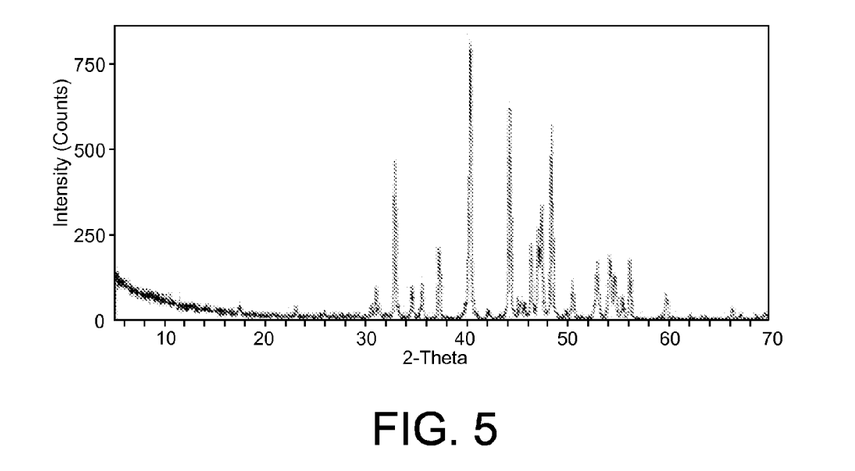
FIG. 5 shows an X-ray diffraction pattern of commercially available ferro phosphorus according to a comparison embodiment.

FIG. 5 shows an X-ray diffraction pattern of commercially available ferro phosphorus according to a comparison embodiment, and for comparison purposes, FIGS. 6-10 shows X-ray diffraction patterns of the composite active electrode material produced by the method and process as described in the embodiments.

Figure 6:
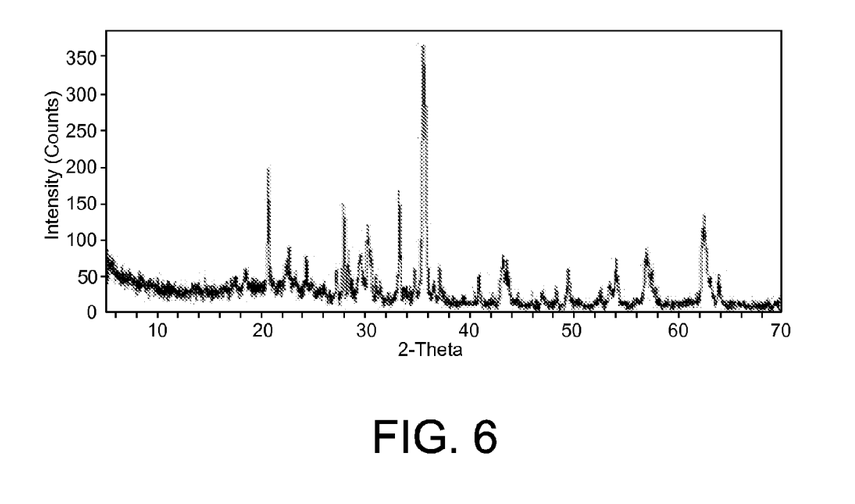
FIG. 6 shows an X-ray diffraction pattern of the result of first sintering ferro phosphorus in the air atmosphere according to one embodiment of the present invention.

FIG. 6 shows an X-ray diffraction pattern of the result of first sintering ferro phosphorus in the air atmosphere according to one embodiment of the present invention. As shown in FIG. 6, the X-ray diffraction pattern shows that all ferro phosphorus peaks disappeared, and that all peaks are lithium phosphate and iron(III) oxide combined.

Figure 7:
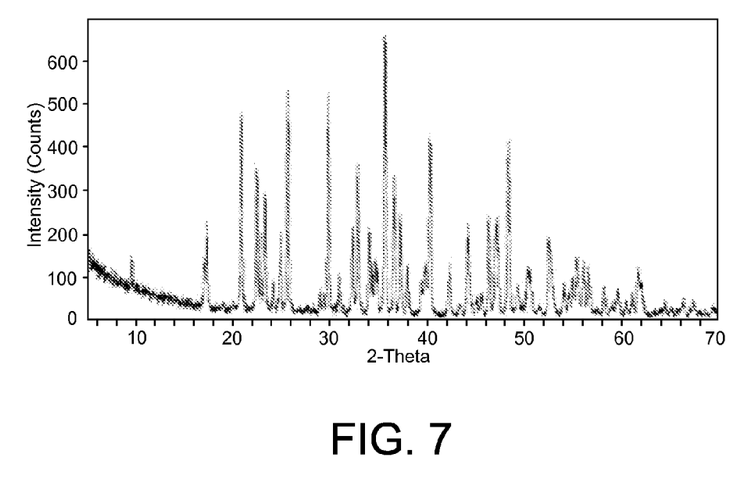
FIG. 7 shows an X-ray diffraction pattern of ferro phosphorus to $LiFePO_4$ in an essentially non-oxidizing atmosphere according to one embodiment of the present invention.

FIG. 7 shows an X-ray diffraction pattern of ferro phosphorus to $LiFePO_4$ in an essentially non-oxidizing atmosphere according to one embodiment of the present invention. As shown in FIG. 7, a certain amount of ferro phosphorus peaks is not converted. The peaks were mostly $LiFePO_4$, ferro phosphorus, and lithium phosphate combined.

Figure 8:
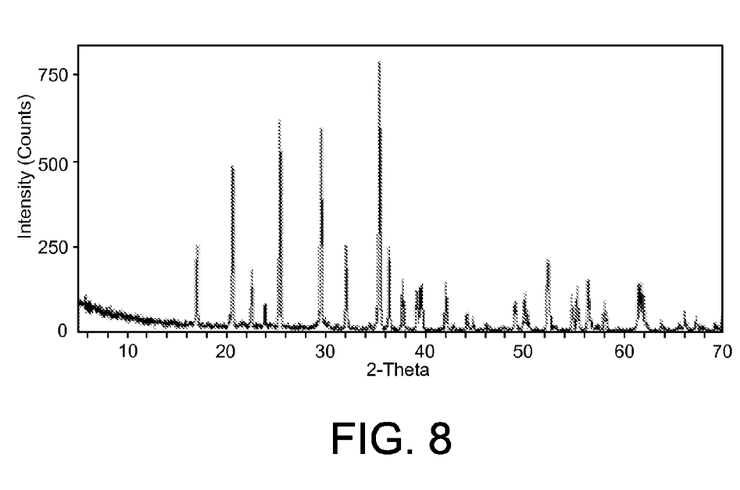
FIG. 8 shows an X-ray diffraction pattern of lithium iron phosphate active material $LiFePO_4$ produced from the second sintering of the material showed in FIG. 6 in an essentially non-oxidizing atmosphere according to one embodiment of the present invention.

FIG. 8 shows an X-ray diffraction pattern of lithium iron phosphate active material $LiFePO_4$ produced from the second sintering of the material showed in FIG. 6 in an essentially non-oxidizing atmosphere according to one embodiment of the present invention. As shown in FIG. 8, the lithium iron phosphate material has no ferro phosphorus residues.

Figure 9:
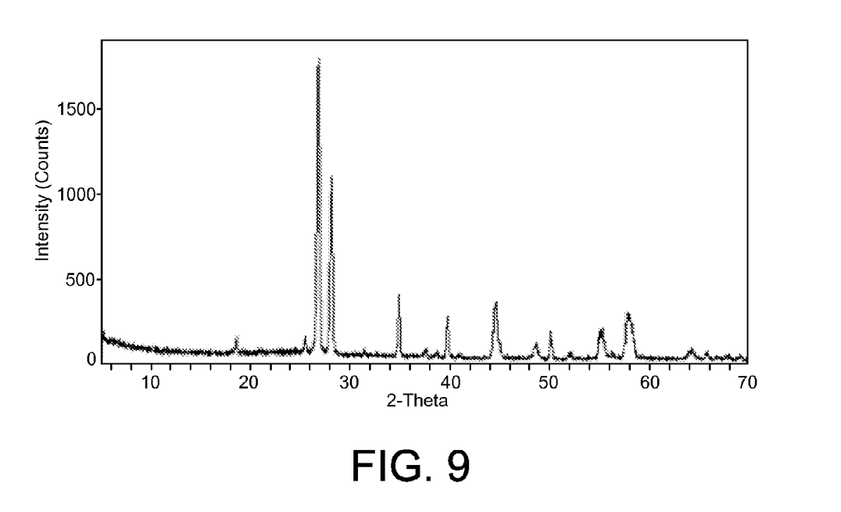
FIG. 9 shows an X-ray diffraction pattern of iron phosphate ($Fe_xPO_4$), by-product from a wet metallurgical industry according to one embodiment of the present invention.
Figure 10:
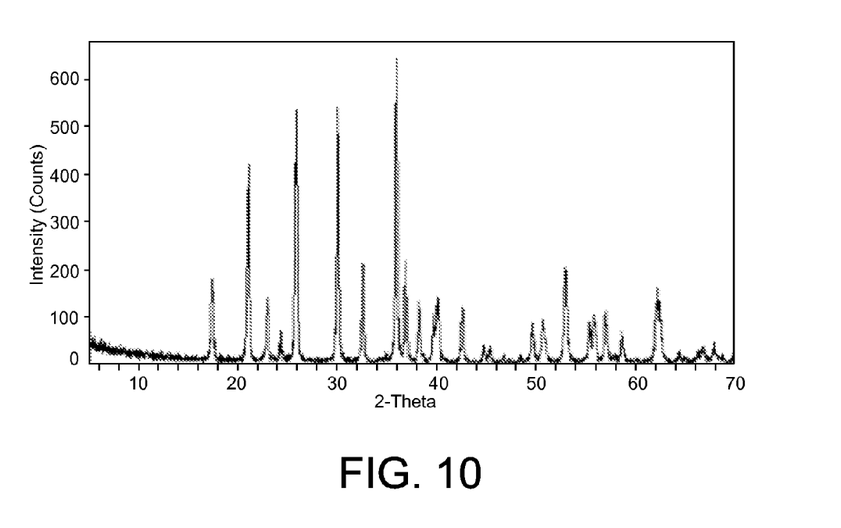
FIG. 10 shows an X-ray diffraction pattern of lithium iron phosphate active material $LiFePO_4$ produced from iron phosphate, a by-product from a wet metallurgical industry XRD shown as FIG. 9 according to one embodiment of the present invention.

FIG. 9 shows an X-ray diffraction pattern of iron phosphate by-product from a wet metallurgical industry according to one embodiment of the present invention, and FIG. 10 shows an X-ray diffraction pattern of lithium iron phosphate active material $LiFePO_4$ produced from iron phosphate, a by-product from a wet metallurgical industry XRD shown as FIG. 9 according to one embodiment of the present invention.

Figure 11:
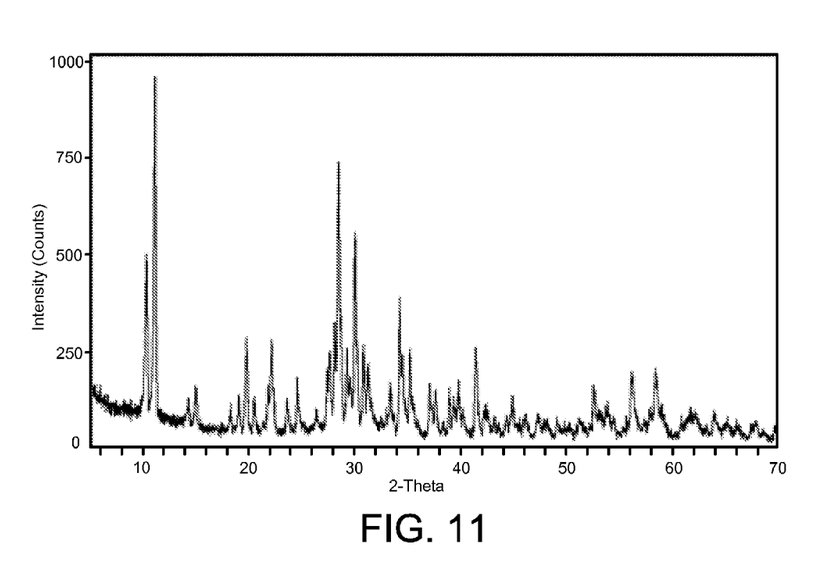
FIG. 11 shows an X-ray diffraction pattern of manganese iron phosphate $Fe_{0.35}Mn_{0.65}PO_4$ produced according to one embodiment of the present invention.
Figure 12:
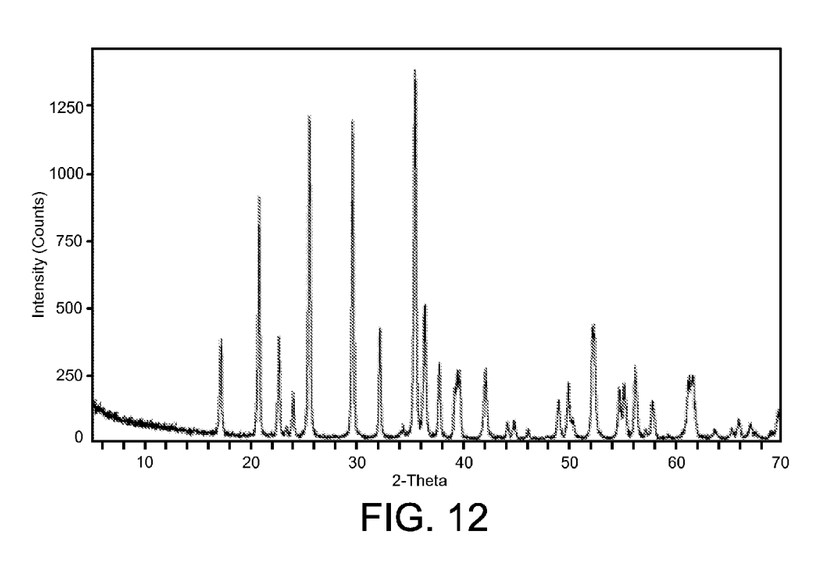
FIG. 12 shows an X-ray diffraction pattern of lithium manganese iron phosphate $LiFe_{0.35}Mn_{0.65}PO_4$ produced with the manganese iron phosphate according to one embodiment of the present invention.

FIG. 11 shows an X-ray diffraction pattern of manganese iron phosphate $Fe_{0.35}Mn_{0.65}PO_4$ produced according to one embodiment of the present invention, and FIG. 12 shows an X-ray diffraction pattern of lithium manganese iron phosphate $LiFe_{0.35}Mn_{0.65}PO_4$ produced with the manganese iron phosphate according to one embodiment of the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

What is claimed is:

1. A method of synthesizing a phosphorous active electrode composite material $AMPO_4$, wherein M is a first element, and A is a second element, the method comprising:
   (a) preparing a first source material comprising the first element M and a phosphorus source material, wherein the first element M in the first source material and the phosphorus in the phosphorus source material has a predetermined molar ratio;
   (b) forming a phosphoric acid aqueous solution with the phosphorus source material, and adding the first source material in the phosphoric acid aqueous solution to form a first mixture;
   (c) drop-wisely adding a hydrogen peroxide aqueous solution in the first mixture with stirring to form a second mixture, wherein the second mixture comprises a phosphate composite comprising the first element M;
   (d) measuring amounts of the first element M and phosphorus (P) in the second mixture, and mixing the phosphate composite in the second mixture with a second source material comprising the second element A to form an intermediate mixture, wherein the intermediate mixture is formed with A:M:P=1.03-1.1:1:1 by molar ratio;
   (e) adding a carbon precursor to the intermediate mixture, wherein the carbon precursor is about 5-30% by weight to the intermediate mixture;
   (f) ball-milling and drying the intermediate mixture; and
   (g) sintering the intermediate mixture in an inert environment at about 250-900° C. for about 6 to 15 hours to form the phosphorous composite active electrode material,
   wherein the first element M is selected from a group consisting of iron (Fe), manganese (Mn), and a mixture thereof; and
   wherein the second element A is selected from a group consisting of lithium (Li), sodium (Na), potassium (K) and a mixture thereof.

2. The method of claim 1, wherein the first source material and the phosphorus source material are low cost by-products respectively obtained in other processes.

3. The method of claim 1, wherein the intermediate mixture is formed by:
   (a) centrifuging the second mixture to obtain wet phosphate composite;
   (b) washing the wet phosphate composite; and
   (c) drying the wet phosphate composite to obtain the phosphate composite.

4. The method of claim 1, wherein
   the phosphorous composite active electrode material is $LiFePO_4$, wherein the first element M is iron (Fe), and the second element A is lithium (Li);
   the first source material comprises at least one of iron powder, iron(III) oxide ($Fe_2O_3$) powder, and iron(II, III) oxide ($Fe_3O_4$) powder; the phosphorus source material comprises at least one of phosphoric acid ($H_3PO_4$) and phosphorus pentoxide (P205); and
   the phosphorous composite active electrode material $LiFePO_4$ is formed with Li:Fe:P=1-1.1:1:1 by molar ratio.

5. The method of claim 1, wherein
   the phosphorous composite active electrode material is $LiFe_xMn_{(1-x)}PO_4$, wherein the first element M comprises iron (Fe) and manganese (Mn), and the second element A is lithium (Li);
   the first source material comprises at least one of iron powder, iron(III) oxide ($Fe_2O_3$) powder, iron(II, III) oxide ($Fe_3O_4$) powder, manganese powder, and manganese dioxide ($MnO_2$) powder;
   the phosphorus source material comprises at least one of phosphoric acid ($H_3PO_4$) and phosphorus pentoxide ($P_2O_5$); and
   the phosphorous composite active electrode material $LiFe_xMn_{(1-x)}PO_4$ is formed with Li:(Fe+Mn):P=1-1.1:1:1 by molar ratio.

6. The method of claim 1, wherein the phosphoric acid aqueous solution comprises about 10-50% phosphoric acid by weight, the hydrogen peroxide aqueous solution comprises about 5-27% hydrogen peroxide by weight, and a pH value of the first mixture is less than about 2.5.

7. A method of synthesizing a phosphorous active electrode composite material $AMPO_4$, wherein M is a first element, and A is a second element, the method comprising:
   (a) forming a phosphate composite from a phosphorus source material and a first source material comprising the first element M, wherein the first element M in the first source material and the phosphorus in the phosphorus source material has a predetermined molar ratio;
   (b) measuring amounts of the first element M and phosphorus (P) in the phosphate composite, and mixing the phosphate composite with a second source material comprising the second element A to form an intermediate mixture, wherein the intermediate mixture is formed with A:M:P=1.03-1.1:1:1 by molar ratio;
   (c) adding a carbon precursor to the intermediate mixture, wherein the carbon precursor is about 5-30% by weight to the intermediate mixture;
   (d) ball-milling and drying the intermediate mixture; and
   (e) sintering the intermediate mixture in an inert environment at a first temperature for a first period of time to form the phosphorous composite active electrode material,
   wherein the first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof; and wherein the second element A is selected from a group consisting of lithium (Li), sodium (Na), potassium (K) and a mixture thereof.

8. The method of claim 7, wherein the first source material and the phosphorus source material are low cost by-products respectively obtained in other processes.

9. The method of claim 7, wherein the first temperature is about 250-900° C., and the first period of time is about 6 to 15 hours.

10. The method of claim 7, wherein
the phosphorous composite active electrode material is $LiFePO_4$, wherein the first element M is iron (Fe), and the second element A is lithium (Li);
the first source material comprises at least one of iron powder, iron(III) oxide ($Fe_2O_3$) powder, and iron(II,III) oxide ($Fe_3O_4$) powder;
the phosphorus source material comprises at least one of phosphoric acid ($H_3PO_4$) and phosphorus pentoxide ($P_2O_5$); and
the phosphorous composite active electrode material $LiFePO_4$ is formed with Li:Fe:P=1-1.1:1:1 by molar ratio.

11. The method of claim 10, wherein the forming of the phosphate composite comprises:
(a) adding the first source material in a phosphoric acid aqueous solution to form a first mixture;
(b) stirring the first mixture for a second period of time;
(c) drop-wisely adding a hydrogen peroxide aqueous solution in the stirred first mixture with stirring for a third period of time to form a second mixture, wherein the second mixture comprises ferric phosphate dihydrate; and
(d) obtaining the ferric phosphate dihydrate from the second mixture as the phosphate composite.

12. The method of claim 11, wherein the forming of the phosphate composite further comprises:
(a) centrifuging the second mixture to obtain wet ferric phosphate dihydrate;
(b) washing the wet ferric phosphate dihydrate; and
(c) drying the wet ferric phosphate dihydrate to obtain the phosphate composite.

13. The method of claim 11, wherein the second period of time is about 0.5-5 hours, the third period of time is about 3-15 hours, the phosphoric acid aqueous solution comprises about 10-50% phosphoric acid by weight, the hydrogen peroxide aqueous solution comprises about 5-27% hydrogen peroxide by weight, and a pH value of the first mixture is less than about 2.5.

14. The method of claim 7, wherein
the phosphorous composite active electrode material is $LiFe_xMn_{(1-x)}PO_4$, wherein the first element M comprises iron (Fe) and manganese (Mn), and the second element A is lithium (Li);
the first source material comprises at least one of iron powder, iron(III) oxide ($Fe_2O_3$) powder, iron(II,III) oxide ($Fe_3O_4$) powder, manganese powder, and manganese dioxide ($MnO_2$) powder;
the phosphorus source material comprises at least one of phosphoric acid ($H_3PO_4$) and phosphorus pentoxide ($P_2O_5$); and the phosphorous composite active electrode material $LiFe_xMn_{(1-x)}PO_4$ is formed with Li:(Fe+Mn):P=1-1.1:1:1 by molar ratio.

15. The method of claim 7, wherein
the phosphorous composite active electrode material is $AFePO_4$, wherein the first element M is iron (Fe);
the phosphate composite is $Fe_xP$; and
the second source material comprises at least one of $A_2CO_3$, AOH, and $A_2O$.

16. The method of claim 15, wherein the forming of the intermediate mixture comprises:
mixing the second source material with the phosphate composite to form a first composite with A:Fe=1.05-1.10:1 by molar ratio;
sintering the first composite at about 250-600° C. for about 2 to 12 hours, cooling the sintered first composite to room temperature, and ball-milling the cooled first composite to obtain a composite powder; and
measuring amounts of the second element A, Fe and P in the composite powder, and mixing the composite powder with the second source material or the phosphate composite to form the intermediate mixture with A:Fe:P=1.03-1.1:1:1 by molar ratio.

17. A method of synthesizing an active electrode composite material $A_aM_b(XO_4)_cZ_d$, wherein M is a first element, A is a second element, X is a metalloid element, and Z is a precursor, the method comprising the steps of:
(a) forming a first mixture from a first source material comprising the first element M and a metalloid source material comprising the first metalloid element X, wherein the first element M in the first source material and the first metalloid element X in the metalloid source material has a predetermined molar ratio;
(b) forming an intermediate composite from the first mixture and a precursor Z;
(c) measuring amounts of the first element M and the metalloid element X in the intermediate composite, and mixing the intermediate composite with a second source material comprising the second element A to form an intermediate mixture, wherein the intermediate mixture is formed with A:M:X=1.03-1.1:1:1 by molar ratio;
(d) adding a carbon precursor to the intermediate mixture, wherein the carbon precursor is about 0-30% by weight to the intermediate mixture;
(e) ball-milling and drying the intermediate mixture; and
(e) sintering the intermediate mixture to form the active electrode composite material,
wherein the first element M is selected from a group consisting of iron (Fe), manganese (Mn), vanadium (V), cobalt (Co), nickel (Ni), aluminum (Al), magnesium (Mg), silicon (Si), calcium (Ca), scandium (Sc), titanium (Ti), chromium (Cr), copper (Cu), zinc (Zn), gallium (Ga), germanium (Ge), strontium (Sr), zirconium (Zr), niobium (Nb), molybdenum (Mo), tantalum (Ta), tungsten (W), lanthanum (La), cerium (Ce), praseodymium (Pr), neodymium(Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a mixture thereof;
wherein the second element A is selected from a group consisting of lithium (Li), sodium (Na), potassium (K) and a mixture thereof;
wherein the metalloid element is selected from a group consisting of phosphorus (P), Si, sulphur (S), Al, Ge, nitrogen (N), V and a mixture thereof; and wherein the precursor Z is selected from a group consisting of functional alcohol group OH, fluorine (F), chlorine (Cl), bromine (Br), and a mixture thereof;

wherein a, b and c are numbers greater than zero, and d is a number greater than or equal to zero.

18. The method of claim 17, wherein the first source material and the metalloid source material are low cost by-products respectively obtained in other processes.

19. The method of claim 17,
wherein the composite active electrode material is $LiFePO_4$, wherein the first element M is iron (Fe), the second element A is lithium (Li), and the metalloid element X is phosphorus (P);

the first source material comprises at least one of iron powder, iron(III) oxide ($Fe_2O_3$) powder, and iron(II,III) oxide ($Fe_3O_4$) powder;

the metalloid source material comprises at least one of phosphoric acid ($H_3PO_4$) and phosphorus pentoxide ($P_2O_5$); and the composite active electrode material $LiFePO_4$ is formed with Li:Fe:P=1-1.1:1:1 by molar ratio.

20. The method of claim 19, wherein the forming of the intermediate composite comprises:
(a) adding the first source material in a phosphoric acid aqueous solution to form the first mixture;
(b) stirring the first mixture;
(c) drop-wisely adding a hydrogen peroxide aqueous solution in the stirred first mixture with stirring to form a second mixture, wherein the second mixture comprises ferric phosphate dihydrate; and
(d) obtaining the ferric phosphate dihydrate from the second mixture as the intermediate composite.

21. The method of claim 17, wherein
the composite active electrode material is $LiFe_xMn_{(1-x)}PO_4$, wherein the first element M comprises iron (Fe) and manganese (Mn), the second element A is lithium (Li), and the metalloid element X is phosphorus (P);

the first source material comprises at least one of iron powder, iron(III) oxide ($Fe_2O_3$) powder, iron(II,III) oxide ($Fe_3O_4$) powder, manganese powder, and manganese dioxide ($MnO_2$) powder;

the phosphorus source material comprises at least one of phosphoric acid ($H_3PO_4$) and phosphorus pentoxide ($P_2O_5$); and the composite active electrode material $LiFe_xMn_{(1-x)}PO_4$ is formed with Li:(Fe+Mn):P=1-1.1:1:1 by molar ratio.

22. The method of claim 17, wherein
the composite active electrode material is $AFePO_4$, wherein the first element M is iron (Fe), and the metalloid element X is phosphorus (P);

the intermediate composite is $Fe_xP$; and the second source material comprises at least one of $A_2CO_3$, AOH, and $A_2O$.

* * * * *